(12) United States Patent
Abe

(10) Patent No.: US 7,352,884 B2
(45) Date of Patent: Apr. 1, 2008

(54) IMAGE PROCESSING METHOD AND APPARATUS OF SAME

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 11/192,592

(22) Filed: Jul. 29, 2005

(65) Prior Publication Data

US 2006/0034501 A1    Feb. 16, 2006

(30) Foreign Application Priority Data

Aug. 12, 2004    (JP)    ............................ P2004-235270

(51) Int. Cl.
*G06K 9/00*    (2006.01)
(52) U.S. Cl. ...................... 382/130; 382/254
(58) Field of Classification Search ................ 382/103, 382/128, 130, 133, 134, 254, 263, 266
See application file for complete search history.

(56) References Cited

U.S. PATENT DOCUMENTS 5,987,094 A * 11/1999 Clarke et al. .................. 378/62

2002/0114499 A1 * 8/2002 Breitenstein et al. ........ 382/128

* cited by examiner

*Primary Examiner*—Matthew C. Bella
*Assistant Examiner*—G. F. Cunningham
(74) *Attorney, Agent, or Firm*—Bell, Boyd & Lloyd LLP

(57) ABSTRACT

Image processing method and apparatus of same are provided. An image processing method includes a first step of processing first image data obtained by capturing an image of a predetermined region including a blood vessel pattern of a biological entity so as to enhance the image corresponding to the blood vessel pattern in the first image data to generate second image data; a second step of processing each pixel data composing the second pixel data generated at the first step to generate index data indicating an average value of pixel data of pixels around a pixel corresponding to the pixel data or a value obtained by leveling pixel data of the surrounding pixels; and a third step of subtracting the index data generated at the second step corresponding to the pixel data from each pixel data composing the second image data generated at the first step to generate third image data.

8 Claims, 10 Drawing Sheets

RD

S12

S14

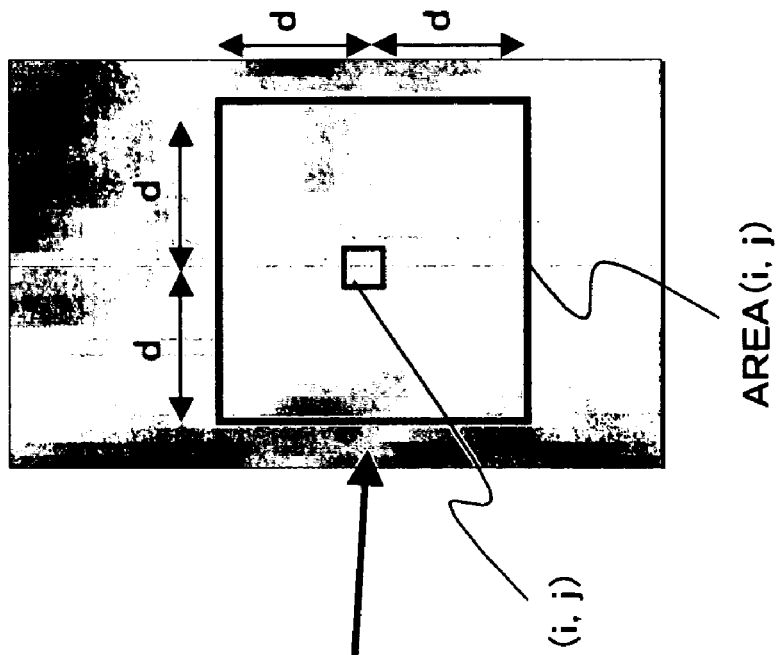
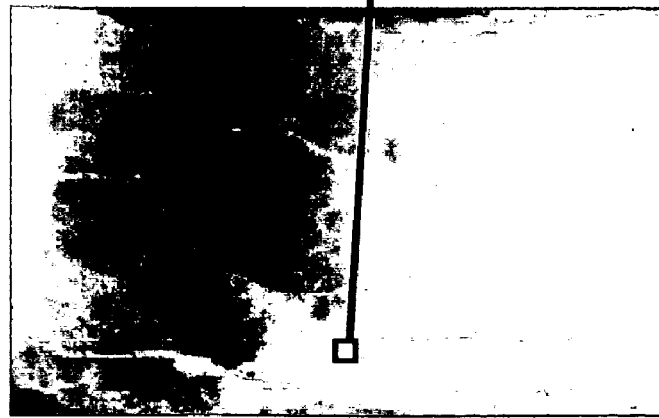
FIG. 7A
FIG. 7B

S18

S16

S20

S18

IMAGE PROCESSING METHOD AND APPARATUS OF SAME

CROSS REFERENCES TO RELATED APPLICATIONS

The present application claims priority to Japanese Patent Application No. 2004-235270 filed in the Japan Patent Office on Aug. 12, 2004, the entire contents of which being incorporated herein by reference.

BACKGROUND

The present invention relates to an image processing method and apparatus for generating an image suitable for identification based on a blood vessel pattern of a biological entity.

The blood vessel pattern of a human finger and the like is unique to the individual. Therefore, there are identification systems for identifying users based on blood vessel patterns. Such identification systems extract blood vessel pattern data from image data obtained by capturing an image of the finger of the user and compare the extracted blood vessel pattern data and previously held blood vessel pattern data for identification.

The above-mentioned identification systems, however, have a problem in that captured image includes images of patterns other than the blood vessel pattern or false images, so the precision of extraction of the blood vessel pattern data is low and practical application is difficult.

SUMMARY

The present invention is provides in an embodiment an image processing method and apparatus able to extract data concerning a blood vessel pattern of a biological entity with a high precision and generate image data from the same.

To solve the problem in the related art, according to a first aspect of the invention, there is provided an image processing method including a first step of processing first image data obtained by capturing an image of a predetermined region including a blood vessel pattern of a biological entity so as to enhance the image corresponding to the blood vessel pattern in the first image data to generate second image data; a second step of processing each pixel data composing the second pixel data generated at the first step to generate index data indicating an average value of pixel data of pixels around a pixel corresponding to the pixel data or a value obtained by leveling pixel data of the surrounding pixels; and a third step of subtracting the index data generated at the second step corresponding to the pixel data from each pixel data composing the second image data generated at the first step to generate third image data.

According to a second aspect of the invention, there is provided an image processing apparatus comprising an enhancing means for processing first image data obtained by capturing an image of a predetermined region including a blood vessel pattern of a biological entity so as to enhance the image corresponding to the blood vessel pattern in the first image data to generate second image data; an index generating means for processing each pixel data composing the second pixel data generated at the enhancing means to generate index data indicating an average value of pixel data of pixels around a pixel corresponding to the pixel data or a value obtained by leveling pixel data of the surrounding pixels; and a reducing means for subtracting the index data generated at the index generating means corresponding to the pixel data from each pixel data composing the second image data generated at the enhancing means to generate third image data.

According to a third aspect of the invention, there is provided an image processing apparatus including an enhancing circuit for processing first image data obtained by capturing an image of a predetermined region including a blood vessel pattern of a biological entity so as to enhance the image corresponding to the blood vessel pattern in the first image data to generate second image data; an index generating circuit for processing each pixel data composing the second pixel data generated at the enhancing circuit to generate index data indicating an average value of pixel data of pixels around a pixel corresponding to the pixel data or a value obtained by leveling pixel data of the surrounding pixels; and a reducing circuit for subtracting the index data generated at the index generating circuit corresponding to the pixel data from each pixel data composing the second image data generated at the enhancing circuit to generate third image data.

Additional features and advantages are described herein, and will be apparent from, the following Detailed Description and the figures.

BRIEF DESCRIPTION OF THE FIGURES

FIGS. 5A to 5C are views for explaining image data processed by the vein clarifying unit shown in FIG. 1.

FIGS. 7A and 7B are views for explaining the processing of the peripheral average brightness subtraction unit shown in FIG. 1.

DETAILED DESCRIPTION

Preferred embodiments of the present invention will be described in detail below while referring to the attached figures.

Figure 1:
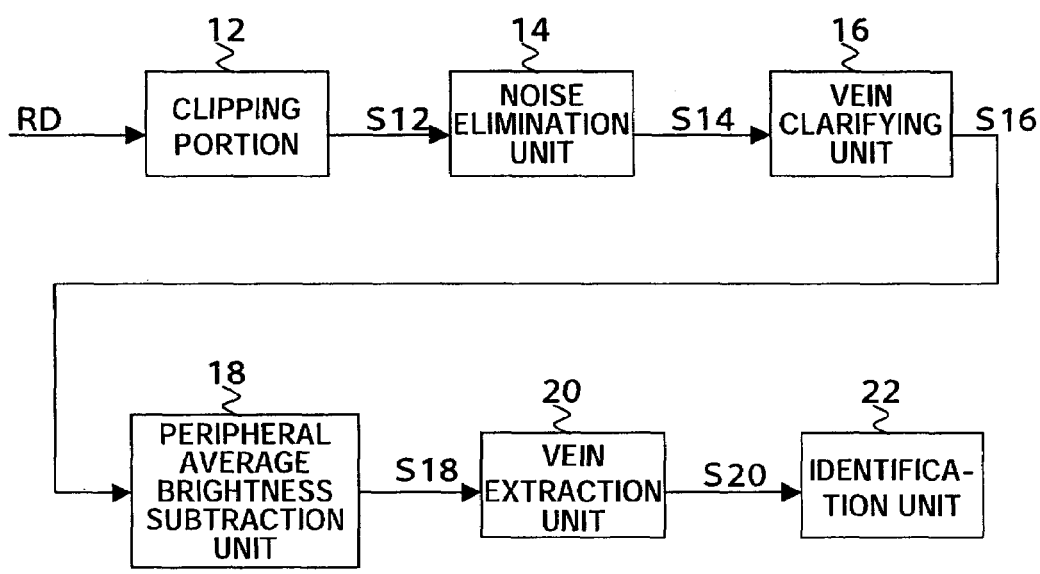
FIG. 1 is a view of the configuration of an identification apparatus of an embodiment of the present invention.

FIG. 1 is a view of the configuration of an identification apparatus 1 of an embodiment of the invention. As shown in FIG. 1, the identification apparatus 1 has for example a clipping portion 12, noise elimination unit 14, vein clarifying unit 16, peripheral average brightness subtraction unit 18, vein extraction unit 20, and identification unit 22. Each of the clipping portion 12, noise elimination unit 14, vein clarifying unit 16, peripheral average brightness subtraction unit 18, vein extraction unit 20, and identification unit 22 is realized by for example dedicated hardware or by executing a predetermined program in a processing circuit.

Below, the components shown in FIG. 1 will be explained in detail.

Clipping Portion 12

Figure 2:
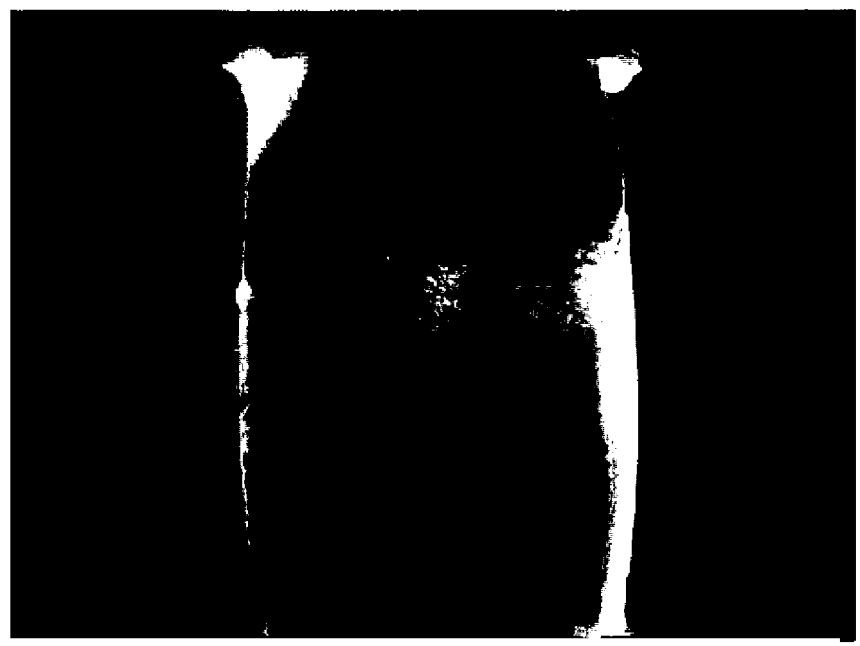
FIG. 2 is a view for explaining image data after clipping input to a noise elimination unit.
Figure 3A:
FIGS. 3A and 3B are views for explaining image data before and after processing of the noise elimination unit shown in FIG. 1.

The clipping portion 12 receives as input identified image (captured image) data RD obtained by capturing an image of a finger of a person being identified (with a vein pattern), clips image data S12 corresponding to the finger vein extraction range from the identified image data RD, and outputs the same to the noise elimination unit 14. Due to this, the effects exerted upon the identification processing by images of portions other than the finger in the identified image data RD can be eliminated. The image in accordance with the identified image data RD becomes for example as shown in FIG. 2, while the image data S12 after clipping becomes for example as shown in FIG. 3A.

Noise Elimination Unit 14

Figure 3B:

The noise elimination unit 14 eliminates the noise from the image data S12 input from the clipping portion 12 to generate the image data S14 and outputs this to the vein clarifying unit 16. The noise elimination unit 14 performs for example median filtering to eliminate noise. The median filtering arranges the brightness data of pixels in for example a predetermined region in order from the smallest data and allocates the brightness data located at the center as the brightness data at the center of the predetermined region. Due to this, the effects due to the image of dust etc. in the image data S12 can be eliminated. The image in accordance with the image data S14 becomes for example as shown in FIG. 3B.

Vein Clarifying Unit 16

Figure 4:
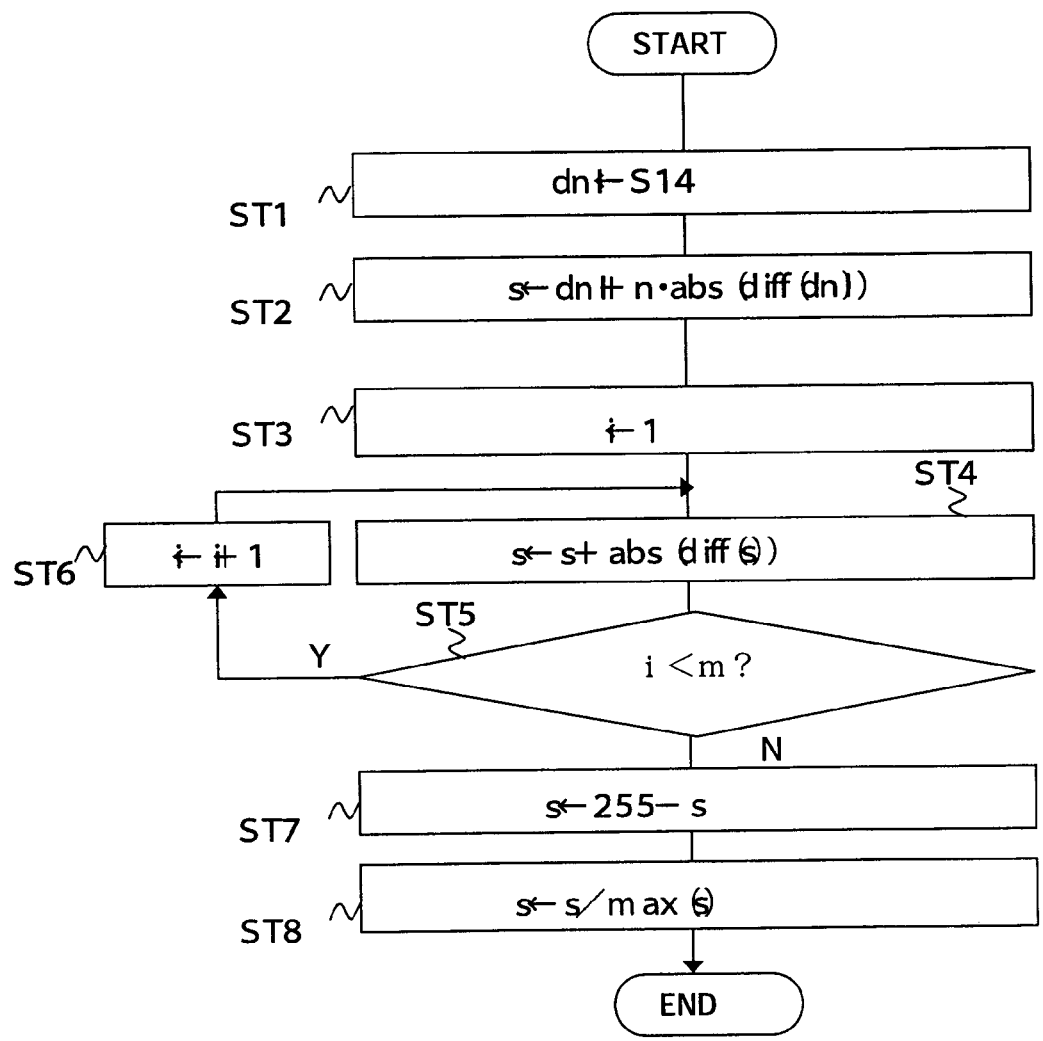
FIG. 4 is a flow chart for explaining an example of the operation of a vein clarifying unit shown in FIG. 1.

The vein clarifying unit 16 performs processing for enhancing (clarifying) the vein pattern in the image data S14 to generate the image data S16 and outputs this to the peripheral average brightness subtraction unit 18. FIG. 4 is a flow chart for explaining the processing of the vein clarifying unit 16 shown in FIG. 1.

Step ST1

The vein clarifying unit 16 enters the image data S14 after the noise elimination input from the noise elimination unit 14 for the variable dnI.

Step ST2

The vein clarifying unit 16 generates differentiated image data diff (dnI) of the variable dnI (first data of the present invention).

At this time, the vein clarifying unit 16 differentiates the brightness value of the image entered for the variable dnI. The vein clarifying unit 16 adds the variable dnI to the data generated by multiplying an absolute value abs(diff(dnI)) of the differentiated image data diff(dnI) by n (for example 10) (second data of the present invention) to calculate a variable s (third data of the present invention). The vein clarifying unit 16 differentiates the value using a differentiation operator not including self-contradictions disclosed in for example *Transactions of Society of Instrument and Control Engineers*, vol. 40, no. 11, Jan. 7, 2001, "Numerical Partial Differentiation Operators not Including Self-Contradictions and Application of Same", Shigeru Ando". The vein clarifying unit 16 uses for example the operator shown in the following Equation (1) as a 5×5 differentiation operator F:

$$F = \begin{bmatrix} -0.003776 & -0.010199 & 0 & 0.010199 & 0.003776 \\ -0.026786 & -0.070844 & 0 & 0.070844 & 0.026786 \\ -0.046548 & -0.122572 & 0 & 0.122572 & 0.046548 \\ -0.026786 & -0.070844 & 0 & 0.026786 & 0.070844 \\ -0.003776 & -0.010199 & 0 & 0.010199 & 0.003776 \end{bmatrix} \quad (1)$$

In the present embodiment, the vein clarifying unit 16 can clarify the veins with a high precision by differentiation.

Step ST3

The vein clarifying unit 16 enters an initial value "1" for the variable i.

Step ST4

The vein clarifying unit 16 calculates the differentiated image data diff(s) of the variable s calculated at step ST2, adds the absolute value abs(diff(s)) thereof to the variable s, and defines this as a new variable s.

Step ST5

The vein clarifying unit 16 judges whether or not the variable i is smaller than a predetermined threshold value m. When judging it is smaller, the routine proceeds to step ST6, while when judging not, the routine proceeds to step ST7. Namely, the vein clarifying unit 16 repeats the processing of step ST4 m number of times (for example 4 times) to clarify the vein pattern.

Step ST6

The vein clarifying unit 16 increments the variable i by exactly "1".

Step ST7

The vein clarifying unit 16 subtracts the variable s from a predetermined value "255" and defines the result as a new variable s.

Step ST8

The vein clarifying unit 16 divides each of the pixel data composing the variable s newly generated at step ST7 by the highest brightness value max(s)x among the pixel data composing the variable s and enters the result for the variable s. Then, the vein clarifying unit 16 outputs the finally generated variable s as the image data S16 to the peripheral average brightness subtraction unit 18.

Here, an image in accordance with the absolute value abs(diff(dnI)) of the differentiated image data diff(dnI) of step ST2 shown in FIG. 4 becomes for example as shown in FIG. 5A. Further, the image in accordance with the variable s generated at step ST2 becomes for example as shown in FIG. 5B. Further, the image in accordance with the variable s generated at step ST8 becomes for example as shown in FIG. 5C.

Peripheral Average Brightness Subtraction Unit 18

The peripheral average brightness subtraction unit 18 processes each of the pixel data composing the image data S16 input from the vein clarifying unit 16 to generate index data x indicating an average value of brightness values indicated by the pixel data of pixels at the periphery of the pixel corresponding to that pixel data or a value obtained by leveling the brightness values indicated by the pixel data of the peripheral pixels. In the following example, a case where the average value ave(i,j) is used as the index data x is exemplified. Then, the peripheral average brightness subtraction unit 18 subtracts the index data x from each pixel data composing the image data S16 to generate the image data S18.

Figure 6:
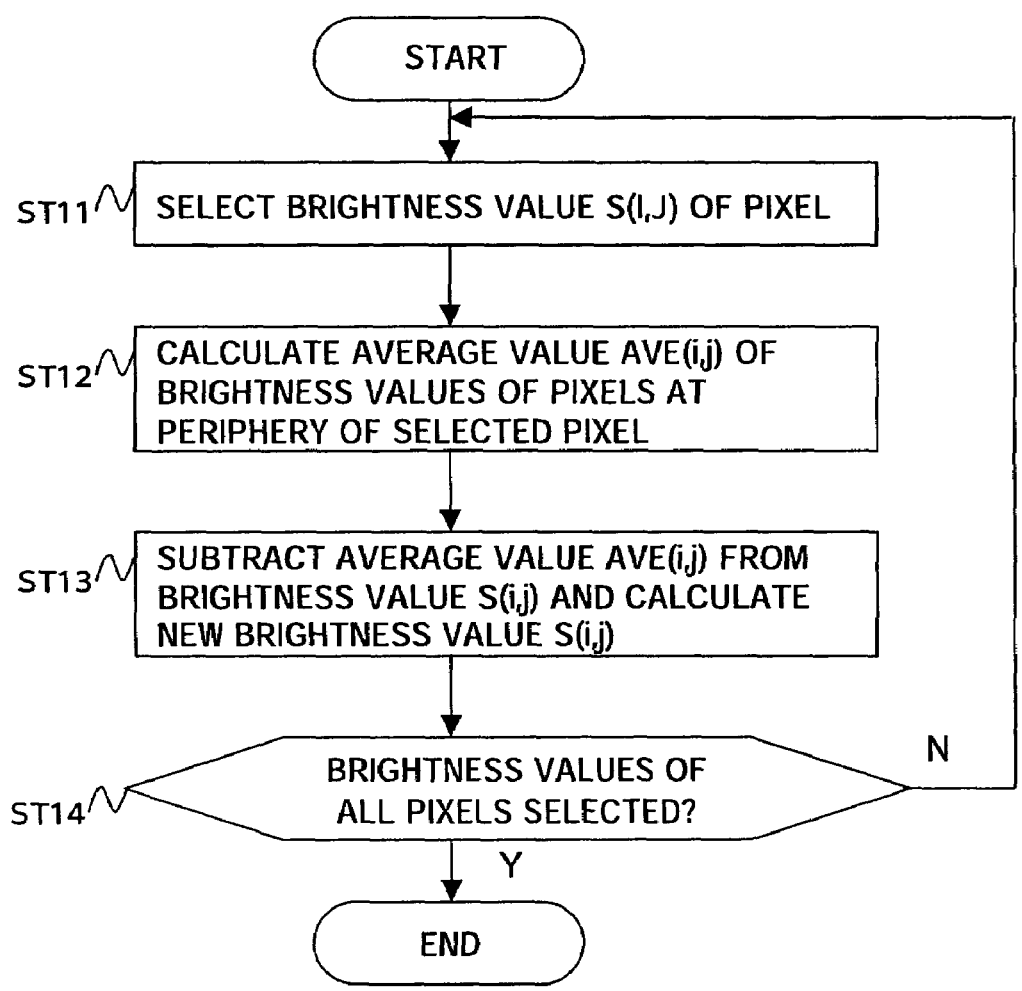
FIG. 6 is a flow chart for explaining the processing of a peripheral average brightness subtraction unit shown in FIG. 1.

FIG. 6 is a flow chart for explaining the processing of the peripheral average brightness subtraction unit 18.

Step ST11

The peripheral average brightness subtraction unit 18 selects an unprocessed pixel among the pixels corresponding to the pixel data composing the image data S16 input from the vein clarifying unit 16 and selects a brightness value s(i,j) indicated by the pixel data corresponding to the selected pixel for processing. Here, i and j indicate numbers in the x- and y-directions in the pixel region corresponding to the image data S16.

Step ST12

The peripheral average brightness subtraction unit 18 calculates the average value ave(i,j) of the brightness values indicated by the pixel data corresponding to the pixels in the predetermined region located at the periphery of the pixel selected at step ST11. The peripheral average brightness subtraction unit 18 processes for the pixel (i,j) in the region corresponding to the image data S16 for example as shown in FIG. 7A to calculate the average value ave(i,j) of the brightness values indicated by the image data of $(2d+1)^2$ pixels in a rectangular area AREA(i,j) having a distance d for each of an x plus direction, an x minus direction, a y plus direction, and a y minus direction with respect to the pixel (i,j) as shown in FIG. 7B. The processing for calculating the average value ave(i,j) is indicated by the following Equation (2).

$$ave(i, j) = \frac{\sum_{v=j-d}^{j+d} \sum_{u=i-d}^{i+d} s(u, v)}{(2d+1)^2} \quad (2)$$

Step ST13

The peripheral average brightness subtraction unit 18 subtracts the average value ave(i,j) calculated at step ST12 from the brightness value s(i,j) indicated by each pixel data composing the brightness data S16 to calculate a new brightness value s(i,j).

Step ST14

Figure 8B:
FIGS. 8A and 8B are views for explaining the image data before and after the processing of the peripheral average brightness subtraction unit shown in FIG. 1.
Figure 8A:

The peripheral average brightness subtraction unit 18 judges whether or not the selection at step ST11 was carried out for all pixel data composing the image data S16. When judging that the selection was not carried out, the routine returns to step ST11, while when judging that the selection was carried out, the processing ends. The peripheral average brightness subtraction unit 18 outputs the image data S18 comprised of the new brightness value s(i,j) to the vein extraction unit 20. According to the above-mentioned processing, image data S18 shown in FIG. 8B in which the vein pattern is clarified is generated based on the image data S16 shown in FIG. 8A.

Vein Extraction Unit 20

Figure 9B:
FIGS. 9A and 9B are views for explaining the image data before and after the processing of a vein extraction unit shown in FIG. 1.
Figure 9A:

The vein extraction unit 20 calculates an average brightness value M of all pixel data composing the image data S18. Then, the vein extraction unit 20 judges whether or not the brightness value indicated by the pixel data is larger than the average brightness value M for each of all of the pixel data composing the image data S18 input at step ST13. When judging that the brightness value is larger, the brightness value is maintained at it is, while when judging that the brightness value is not larger, the brightness value of the pixel data is made zero and new image data S20 is generated. By the above-mentioned processing, the image data S20 shown in FIG. 9B obtained by further clarifying the vein pattern is generated based on the image data S18 shown in FIG. 9A.

Identification Unit 22

The identification unit 22 compares the image data S18 input from the peripheral average brightness subtraction unit 18 and vein pattern data REF previously stored for identification and judges whether or not the person being identified is legitimate.

Figure 10:
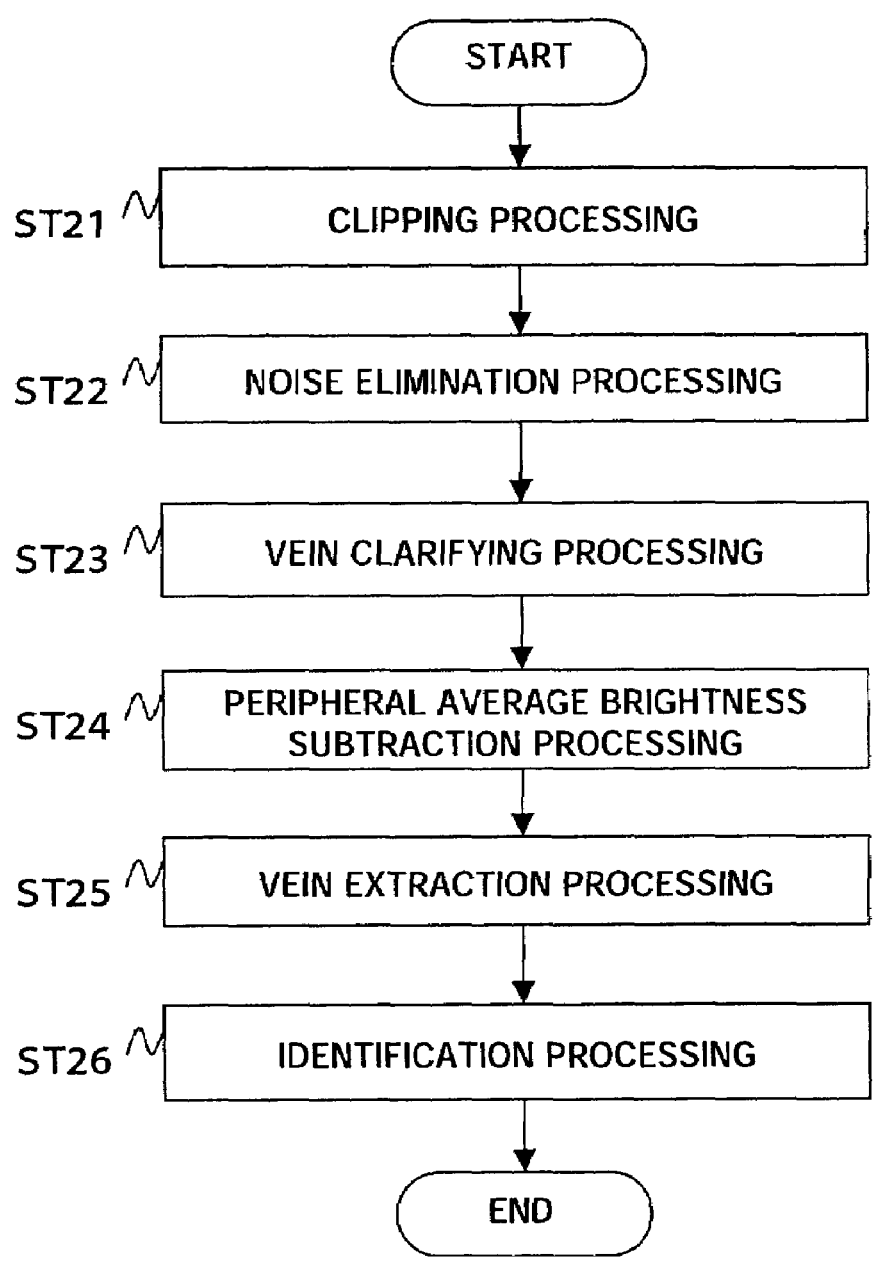
FIG. 10 is a flow chart for explaining an example of the entire operation of the identification apparatus shown in FIG. 1.

Below, an example of the overall operation of the identification apparatus 1 shown in FIG. 1 will be explained. FIG. 10 is a flow chart for explaining an example of the overall operation of the identification apparatus 1 shown in FIG. 1.

Step ST21

The clipping portion 12 receives as input the identified image (imaging image) data RD obtained by capturing an the finger of the person being identified, clips the image data S12 corresponding to the finger vein extraction range in identified image data RD, and outputs the same to the noise elimination unit 14.

Step ST22

The noise elimination unit 14 eliminates the noise from the image data S12 input from the clipping portion 12 at step ST21 to generate the image data S14 and outputs this to the vein clarifying unit 16.

Step ST23

The vein clarifying unit 16 performs the processing explained by using FIG. 4 for enhancing (clarifying) the vein pattern in the image data S14 input from the noise elimination unit 14 at step ST22 to generate the image data S16 and outputs this to the peripheral average brightness subtraction unit 18.

Step ST24

The peripheral average brightness subtraction unit 18, as explained by using FIG. 6, processes each of the pixel data composing the image data S16 input from the vein clarifying unit 16 at step ST23 to generate an index data x indicating the average value of brightness values indicated by the pixel data of pixels at the periphery of the pixel corresponding to that pixel data or the value obtained by leveling the brightness values indicated by the pixel data of the peripheral pixels. Then, the peripheral average brightness subtraction unit 18 subtracts the index data x from each pixel data composing the image data S16 to generate the image data S18.

Step ST25

The vein extraction unit 20 calculates the average brightness value M of all pixel data composing the image data S18 input at step ST24. Then, the vein extraction unit 20 processes each of all pixel data composing the image data S18 input at step ST13 to judge whether or not the brightness value indicated by the pixel data is larger than the average brightness value M, maintains the brightness value of the pixel data judged to be large as it is, reduces to zero the brightness value of the pixel data judged not to be large, and generates new image data S 20.

Step ST26

The identification unit 22 compares the image data S18 input from the peripheral average brightness subtraction unit 18 at step ST25 with the vein pattern data REF stored previously for the identification and judges whether or not the person being identified is legitimate.

As explained above, according to the identification apparatus 1, as explained by using FIG. 6, the peripheral average brightness subtraction unit 18 processes each of the pixel data composing the image data S16 to generate index data x indicating the average value of brightness values indicated by the pixel data of pixels at the periphery of the pixel corresponding to that pixel data or the value obtained by leveling the brightness values indicated by the pixel data of the peripheral pixels. Then, the peripheral average brightness subtraction unit 18 subtracts the index data x from each of the pixel data composing the image data S16 to generate the image data S18. By this, it is possible to generate image data S18 from which false images or images other than the vein pattern included in the image data S16 have been suitably removed and possible to enhance the precision of identification at the identification unit 22.

Further, according to the identification apparatus 1, the vein clarifying unit 16 shown in FIG. 1 performs the vein clarifying processing as explained by using FIG. 4. By this, it is possible to perform the above-mentioned processing in the peripheral average brightness subtraction unit 18 with a high precision.

The present invention is not limited to the embodiment explained above. In the above embodiment, as the enhancing processing of the present invention, the processing explained by using FIG. 4 was exemplified, but other enhancing processing may be used as well so far as it is processing for enhancing the vein pattern.

The present invention can be applied to a system for identification based on a blood vessel pattern.

Note that at least one of the clipping portion 12, noise elimination unit 14, the vein clarifying unit 16, the peripheral average brightness subtraction unit 18, the vein extraction unit 20, and the identification unit 22 may be realized by a circuit or a program executed by a computer.

Each of the clipping portion 12, noise elimination unit 14, vein clarifying unit 16, peripheral average brightness subtraction unit 18, vein extraction unit 20, and identification unit 22 is realized by for example dedicated hardware or by executing a predetermined program in a processing circuit.

It should be understood by those skilled in the art that various modifications, combinations, sub-combinations, and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image processing method comprising:
   a first step of processing first image data obtained by capturing an image of a predetermined region including a blood vessel pattern of a biological entity so as to enhance the image corresponding to the blood vessel pattern in the first image data to generate second image data;
   a second step of processing each pixel data composing the second image data generated at the first step to generate index data indicating an average value of pixel data of pixels around a pixel corresponding to the pixel data or a value obtained by leveling pixel data of the surrounding pixels; and
   a third step of subtracting the index data generated at the second step corresponding to the pixel data from each pixel data composing the second image data generated at the first step to generate third image data.

2. An image processing method as set forth in claim 1, further comprising a fourth step of processing each pixel data composing said third image data generated at said third step to reduce the value of the pixel data of a predetermined threshold level or less to zero to generate fourth image data.

3. An image processing method as set forth in claim 1, wherein said first step comprises:
   a fifth step of differentiating said first image data to generate the first data and multiplying an absolute value of said first data to generate the second data,
   a sixth step of adding said second data generated at said fifth step to said first image data to generate the third data, and
   a seventh step of differentiating said third data generated at said sixth step and adding the absolute value of the same to said third data to generate said second image data.

4. An image processing method as set forth in claim 3, wherein said first step uses said second image data generated at said seventh step as said first image data of said fifth step and repeats said fifth step, said sixth step, and said seventh step a plurality of times to generate said second image data.

5. An image processing method as set forth in claim 1, further comprising an eighth step of comparing said third image data generated at said third step and pre-held identification data to identify said biological entity.

6. An image processing apparatus comprising:
   an enhancing means for processing first image data obtained by capturing an image of a predetermined region including a blood vessel pattern of a biological entity so as to enhance the image corresponding to the blood vessel pattern in the first image data to generate second image data;
   an index generating means for processing each pixel data composing the second image data generated at the enhancing means to generate index data indicating an average value of pixel data of pixels around a pixel corresponding to the pixel data or a value obtained by leveling pixel data of the surrounding pixels; and
   a reducing means for subtracting the index data generated at the index generating means corresponding to the pixel data from each pixel data composing the second image data generated at the enhancing means to generate third image data.

7. An image processing apparatus as set forth in claim 6, further comprising an extracting means for processing each pixel data composing said third image data generated at said subtracting means to reduce the value of the pixel data of a predetermined threshold level or less to zero to generate fourth image data.

8. An image processing apparatus comprising:
   an enhancing circuit for processing first image data obtained by capturing an image of a predetermined region including a blood vessel pattern of a biological entity so as to enhance the image corresponding to the blood vessel pattern in the first image data to generate second image data;
   an index generating circuit for processing each pixel data composing the second image data generated at the enhancing circuit to generate index data indicating an average value of pixel data of pixels around a pixel corresponding to the pixel data or a value obtained by leveling pixel data of the surrounding pixels; and
   a reducing circuit for subtracting the index data generated at the index generating circuit corresponding to the pixel data from each pixel data composing the second image data generated at the enhancing circuit to generate third image data.

* * * * *